US004001784B2

United States Statutory Invention Registration [19]

[11] Reg. Number: H1784

Wakker

[45] Published: Feb. 2, 1999

[54] TRIBOLOGICAL ARRANGEMENT

[75] Inventor: Andre Wakker, Louvain-la-Neuve, Belgium

[73] Assignee: Shell Oil Company, Houston, Tex.

[21] Appl. No.: 531,509

[22] Filed: Sep. 21, 1995

[30] Foreign Application Priority Data

Sep. 22, 1994 [EP] European Pat. Off. ..... 94202746

[51] Int. Cl.[6] ..... B32B 27/00

[52] U.S. Cl. ..... 428/500

[58] Field of Search ..... 428/500, 501, 428/523, 524, 525; 252/12; 74/640, 721, 431

[56] References Cited

U.S. PATENT DOCUMENTS 5,256,335 10/1993 Byrd et al. ..... 252/500

5,504,139 4/1996 Davies et al. ..... 524/504

*Primary Examiner*—Charles T. Jordan

[57] ABSTRACT

Arrangement comprising parts which rub against each other, in which arrangement the contacting surface of the one part comprises a polyketone and the contacting surface of the other part comprises a polymer.

9 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TRIBOLOGICAL ARRANGEMENT

FIELD OF THE INVENTION

The present invention relates to an arrangement comprising parts which rub against each other.

BACKGROUND OF THE INVENTION

Such arrangement will hereinafter be called a tribological arrangement. Examples of tribological arrangements are sets of gears and bearings. Further examples are belt chains, plane and roller bearings, linear bearings, sleeve bearings, pulleys, sliding plates and other similar devices which have long been used to transmit, communicate, or facilitate motion and power in mechanical devices.

In many cases, metal parts are used in tribological arrangements. Parts having polymeric contacting surfaces form an attractive alternative offering one or more of the following advantages: greater shock and vibration dampening, reduced weight, enhanced corrosion protection, reduced running noise, decreased power and maintenance use, and more freedom of component design. These advantages are especially important in applications such as printers, copying machines and household appliances, such as shaving apparatus and video apparatus. The polymers often used in tribological arrangements are nylon and polyacetal. However, tribological arrangements made of such polymer show less good wear, i.e. the amount of material worn off relative to the force applied to the material. This means that the arrangements have an arc relatively short life time.

It would be desirable if the parts of the arrangement would be amenable to machining or processing. A further requirement is that the material properly holds a tolerance, is able to withstand the torsional stresses of start-up and shut-down, and from cyclical fatigue.

Problems can result in a failure of the tooth from excessive wear which can be compounded by plastic flow or creep due to thermal softening. Additionally, tooth bending fatigue, contact fatigue (pitting and spalling), thermal fatigue, tooth bending impact, tooth shear, tooth shear, tooth clipping, case crushing, torsional shear, and stress ruptures have similar impact. The role of material selection and preparation thus clearly have much to do with the successful design of a motion and power transmission strategy. Low heat resistance, large thermal deformation, large shrinkage upon processing, and mediocre mechanical strength have precluded the use of numerous thermoplastics, thermosets, and resins from serious consideration in demanding applications.

While these considerations clearly apply to the structure and manufacture of gears, it should also be borne in mind that almost any device used to transmit, communicate, or facilitate power and motion necessarily involves similar concerns. For example, cams are generally used to communicate motion and power by means of a connection between an edge (or a groove therein) or surface and a follower. In addition to repetitive/cyclic movement and imposition of force acting on both cam and follower, these mechanisms are often designed to - incorporate large accelerations. Thus, the use of materials which cannot hold a tolerance (e.g., through loss of material) or which are not amenable to precision processing or manufacture can easily result in wildly eccentric motion and, ultimately, failure. It is therefore important to employ materials which can be worked to precision, which function well when placed in communication with each other, and which can withstand repetitive/cyclic movement and impact.

The same can be said of bearings with rolling or sliding contact. The repetitive and cyclic facilitation of motion inevitably raises concerns analogous to those of gears and cams.

Indeed, one skilled in the art will readily appreciate that from a materials perspective, an improvement in a means for transmitting power and motion is generally applicable to all means of power and motion transmission.

Rolling contact and sliding contact are manifested in most power and motion gear applications. Rolling contact predominates in motion and power transmission when such applications are between parallel shafts or between intersecting shafts. When non-parallel and non-inter- secting shafts are employed, sliding contact predominates. Thus, materials useful in power and motion transmission between all shaft set-ups exhibit both good wear and good strength.

SUMMARY OF THE INVENTION

The present invention provides a tribological arrangement comprising polymer contacting surfaces and having a high wear resistance. The search for such arrangement is hindered by the fact that it is difficult to predict the tribological properties of a certain combination of polymeric materials, even if both are known from different combinations.

The present invention relates to an arrangement comprising parts which rub against each other, in which arrangement the contacting surface of one part comprises a polyketone which is a linear alternating polymer of carbon monoxide and an olefinically unsaturated compound and the contacting surface of another part comprises a polymer, preferably a polymer based on carbon, hydrogen and oxygen, which polymer is selected from the group consisting of polyacetals and polyketones which are linear alternating polymers of carbon monoxide and an olefinically unsaturated compound. Such arrangement shows especially good properties when used at a relatively high torque. Furthermore, the present invention relates to a system for transmitting power and motion comprising at least two means for transmitting power and motion wherein at least one means comprises a polyketone polymer and communicates power and motion to another such means comprising a polyketone polymer. The transmission of motion and power includes the translation, communication or facilitation of power and motion.

DETAILED DESCRIPTION

Figure 1:
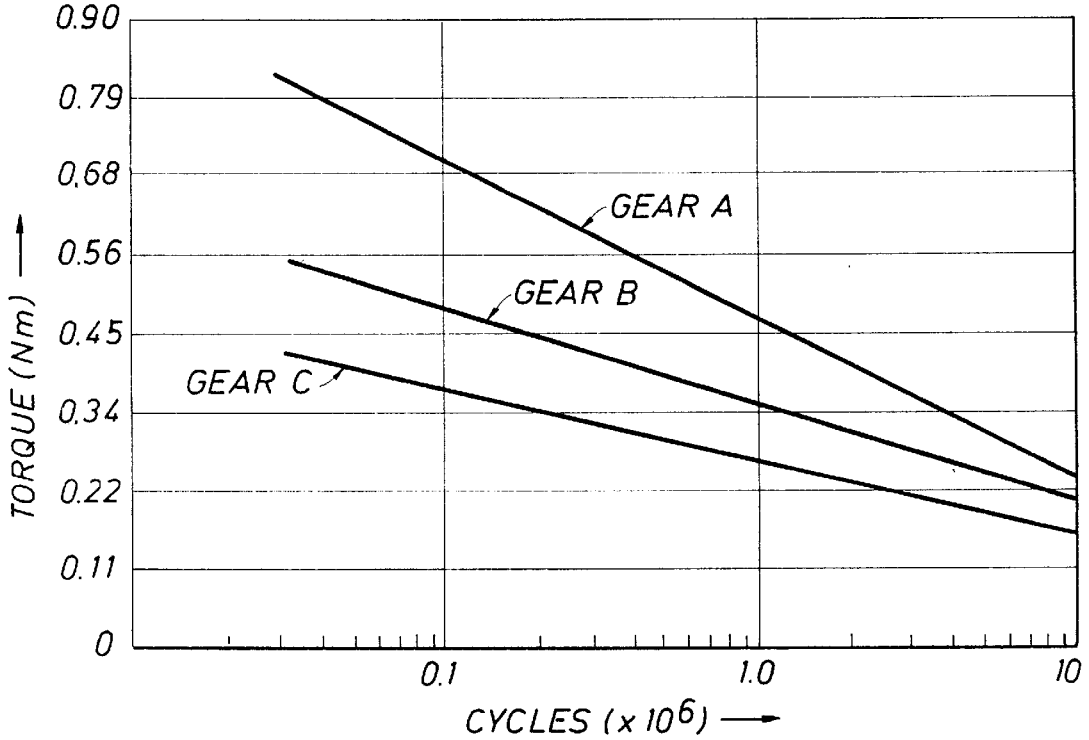
FIG. 1 shows that polyketone gears endure torques for a much greater period of time.

Gears according to the present invention have been found to have tooth strength and wear resistance so that they are capable of bearing torques for power and motion transmission.

It has further been found that the low mold shrinkage that is attainable when such gears are, for example, injection molded results in excellent tooth quality. That is, there is very little error in single pitch, neighbouring pitch, accumulating pitch, etc. Thus, not only are spur gears successfully made according to this invention, but so too are cylindrical gears, helical gears, double helical gears, straight bevel gears, spiral bevel gears, zerol bevel gears, crossed helical gears, hypoid gears, worm gears, multithread worm gears, and other gears in which the intermeshing pitch circle is not on the same piane as the direction in which the force is transmitted-or their pitch helix is not parallel to the axial direction of the cylinder.

Suitable means for transmitting motion and power include gears, belts, chain and sprocket assemblies, plane and roller bearings, linear bearings, sleeve bearings, pulleys, sliding plates and other like mechanisms. Preferred means are gears. Most preferred means are spur gears.

The systems of the present invention have been found capable of transmitting power and motion up to the point of the mechanical failure of the means. Thus, for example, when the system comprises two or more spur gears, the gears will communicate motion and power until gear teeth break. This is atypical of polymeric gear systems which typically fail to communicate motion and power well before such breakage occurs. Rather, such systems of the prior art generally exhibit tooth wear until each tooth of one gear slips past the teeth of the gear with which it is to communicate.

With the contacting surfaces of the parts is meant the surfaces which rub against each other. As will be apparent, the advantage of the present invention is attained if the contacting surfaces are made according to the invention. However, for ease of manufacture, it is preferred that not only the surfaces of the parts will be of these specific polymers, but the part as a whole will be made of the polymer. In such case, the tribological arrangement comprises one part which consists of the polyketone while the other part consists of a polymer, preferably one based on carbon, hydrogen and oxygen. As will be discussed hereinafter, the parts can optionally further contain additives. Fillers, extenders, lubricants, pigments, plastizers, and other polymeric materials can be added to the compositions to improve or otherwise alter the properties of the composition.-The amount of additive which can be present can be as high as 50% by weight.

A preferred tribological arrangement according to the present invention comprises a part having a surface comprising a polyketone and another part having a surface comprising a polyacetal. The polyacetal can be a homopolymer or a copolymer. A suitable polyacetal is polyoxymethylene, e.g. "POLYACETAL H", a polyacetal polymer commercially available from Du Pont, or a copolymer containing a major amount of groups according to the formula —CHR—O—and a minor amount of groups according to the formula —$CH_2$—$CH_2$—0, in which R is hydrogen or an alkyl group.

The polyketone used in the present invention is a linear alternating polymer of carbon monoxide and an olefinically unsaturated compound, i.e. a linear polymer containing equimolar quantities of the monomers carbon monoxide and unsaturated compounds in which polymer substantially every monomer unit which has been derived from an unsaturated compound is positioned next to a monomer unit which has been derived from carbon monoxide, and the other way round. Preferably, the polyketones are linear alternating polymers of carbon monoxide and an olefinically unsaturated compound such as ethene, propene, butene, isobutene, amylene, butadiene, isoprene and/or vinyl compounds such as styrene and/or alphamethyl styrene. Preferably, the olefinically unsaturated compound is ethene, propene and/or 1-butene. A preferred polyketone is built from carbon monoxide, ethene, and optionally one or more other unsaturated hydrocarbons, such as hydrocarbons of from 3 to 20 carbon atoms, inclusive, preferably from 3 to 10 carbon atoms inclusive. Preferably, the other unsaturated hydrocarbon is propene and/or 1-butene. A preferred polyketone has been described in EP-A-213 671. Attractive linear - alternating polyketones for use in the invention are linear alternating polymers of carbon monoxide, ethylene and propylene. The propylene content should preferably be less than 7.0% by weight of the polyketone for a good heat distortion temperature, preferably from 1.0 to 4.0 % by weight of the polyketone. Especially preferred for use in the present invention are polyketones having a limiting viscosity number (LVN) measured in m-cresol at 60° C. of from 1.0 to 5.0, preferably from 1.3 to 4.0 dl/g, in particular from 2.1 to 3.0 dl/g.

Methods of making the polyketone are known in the art. Suitable methods have been described in the following documents: EP-A-307 027, EP-A-181 014, EP-A-121965, EP-A-391 579, EP-A-314 309 and European patent application no. 92203697.5. Polyketones obtainable by these processes are especially suitable for use in the present invention.

The polyketone can be present as such, or it can be reinforced by mixing it with mica and/or glass fibres. Mixtures which are especially suitable have been described in EP-A-306116 and in EP-A-474309.

The polymers from which the contacting surfaces have been made can further have been mixed with internal lubricants such as polytetrafluoroethylene, graphite, molybdenum disulfide, and various oils to enhance wear resistance and to decrease frictional losses. The presence of an internal lubricant or an external lubricant, such as oil or grease, can further increase the wear resistance and reduce frictional losses between the contacting surfaces. A preferred internal lubricant is a silicone oil. Useful silicone oils can be described as linear chains of polydimethyl siloxane with viscosities ranging from 1.000–300.000 centistokes. Silicone oils with high viscosities of from 100,00w centistokes are preferred. Typically, silicone oil(s) are present in an amount of from 0.1–5 wt%, and preferably from 2–4 wt% based on weight of polyketone.

It has been found that the presence of suitable silicone oils means that the dynamic coefficient of friction (DCOF) is lowered, while the limiting pressure velocity (LPV) is increased. During relative motion of two surfaces in contact the DCOF is the ratio of the resulting frictional force to the applied normal force while holding the relative surface velocity constant over time.

While holding the relative surface velocity constant between two specimens in contact and increasing the applied normal force in a stepwise manner in time, the LPV is the multiplicative product of the normal pressure and surface velocity at the step just prior to catastrophic material failure due to thermal softening.

A further preferred internal lubricant is a combination of fluorinated hydrocarbons and silicone oils. Fluorinated hydrocarbons (fluoropolymers) useful in this application typically have a melting temperature at least 5–10 degrees above 278° C. Examples of such fluoropolymers include perfluoroalkoxy resin (PFA), ethylene-tetrafluoroethylene (ETFE), fluorinated ethylene propylene (FEP) and polytetrafluoroethylene (PTFE). PTFE is preferred. The fluoropolymers are generally present in an amount of from 1–20 wt%, and preferably from 5–15 wt% based on total of polyketone.

Useful silicone oils are linear chains of polydimethyl siloxane with viscosities ranging from 1.000–300.000 centistokes. Typically, silicone oil(s) are present together with fluorinated hydrocarbons in an amount of from 0.1–5 wt%, and preferably from 0.5–2 wt%, and preferably from 0.5–2 wt% based on amount of polyketone.

The combination of useful silicone oils and fluorinated hydrocarbons gives a further improvement in DCOF. It is thought that the silicone oil adheres preferentially to the fluoropolymers and acts as a dispersing agent, thereby reducing coalescence during the compounding step. A better dispersion of the fluoropolymer is thought to lead to superior tribological properties, and in some cases to improvements in impact energy and general overall toughness.

Further, the polymers can contain additives which are known in the art, such as flame retardants, stabilizers, pigments, mold release agents, antioxidants and fillers.

The polymer containing parts can be manufactured by for example a process such as injection molding.

It will be clear that an arrangement according to the present invention can contain more than two parts which rub against each other. Tribological arrangements in which the set-up according to the present invention can advantageously be used, are gears, bearings, ball- bearings, cams, slides, ratchets, pumps, electrical contacts and prostheses.

EXAMPLES 1–4

In each of the examples 1–4, neat polymer was processed to fabricate spur gears. Two different types of polyketone polymer were used: a polyketone homopolymer formed from ethylene and carbon monoxide was used to fabricate one set of polyketone gears and a polyketone copolymer formed from ethylene, carbon monoxide, and propylene was used to fabricate another. In each example it was found that both sets of polyketone gears performed substantially identically. Thus, results for both sets of polyketone gears are reported as Gear A. A nylon 6,6 composition sold under the tradename "ZYTEL 101" by E.I. du Pont de Nemours & Co. was used to fabricate Gear B and an acetal copolymer sold under the tradename "CELON M90" by Hoechst Celanese Corporation was used to fabricate Gear C.

Spur Gear mold inserts obtained from ABA PGT Inc. of Manchester, Connecticut were modified so that the resulting gears would be of two varieties: a 33 tooth gear (33T), and a 34 tooth gear (34T). Polyketone polymers were injection molded without the use of processing aids or additives. Acetal and nylon gears were injection molded with the inclusion of processing aids and additives as sold with the polymer in its pelletized form. Each polymer used to produce a given size gear was processed through the same mold (e.g., all 34T gears were made from the same mold, etc.). Results were averaged for all gears of a given type. For example, results reported for weight loss for Gear A is the average weight loss for 33T and 34T tested as a meshing pair. In each case, the gears were formed to have an involute geometry with tip and root relief. Each of the 33T and 34T gears had a diametral pitch of 12 and theoretical pitch diameters of 7.19 cm (2.83 inches) and 6.99 cm (2.75 inches) respectively.

In each example, each gear was tested without lubrication.

EXAMPLE 1

Gears were affixed to a four-square gear tester having two shafts; a drive shaft connected to a variable speed motor and a torsion bar parallel to the drive shaft. One steel gear was affixed to each shaft which were then placed in communication with each other so that the motion of the drive shaft was transmitted to the torsion bar. At the end of the shafts opposite the motor, a gear made of polymer was affixed to each shaft; one a 33T and the other a 34T. The two polymer gears were placed in communication with each other. Thus, motion was also translated between the two polymer gears. A torquemeter was placed approximately midway along the drive shaft to measure and adjust the amount of torque placed on the system.

The four-square gear tester was run at 1200 revolutions per minute (RPM) giving a pitch line velocity of 264 m/min (865 ft/min). Torque was held constant throughout each run. Gear life was determined by running the tester under these conditions until torque could no longer be transferred from one polymeric gear to the other. Results are shown in FIG. 1.

This example shows that polyketone gears endure torques for a much greater period of time (as measured by cycles of operation) than do commonly used polymeric gears. Further, it was found that gear tooth failure occurred in polyketone gears as a result of mechanical fatigue failures. Failures in the case of each of the other polymers occurred as a result of wear failures. This shows that, unlike most other polymeric gear systems, polyketone gear systems can be stressed to their mechanical limit without significant loss in tooth dimensions even when the gears in direct communication with each other are comprised of the same polymer.

EXAMPLE 2

Figure 2A:
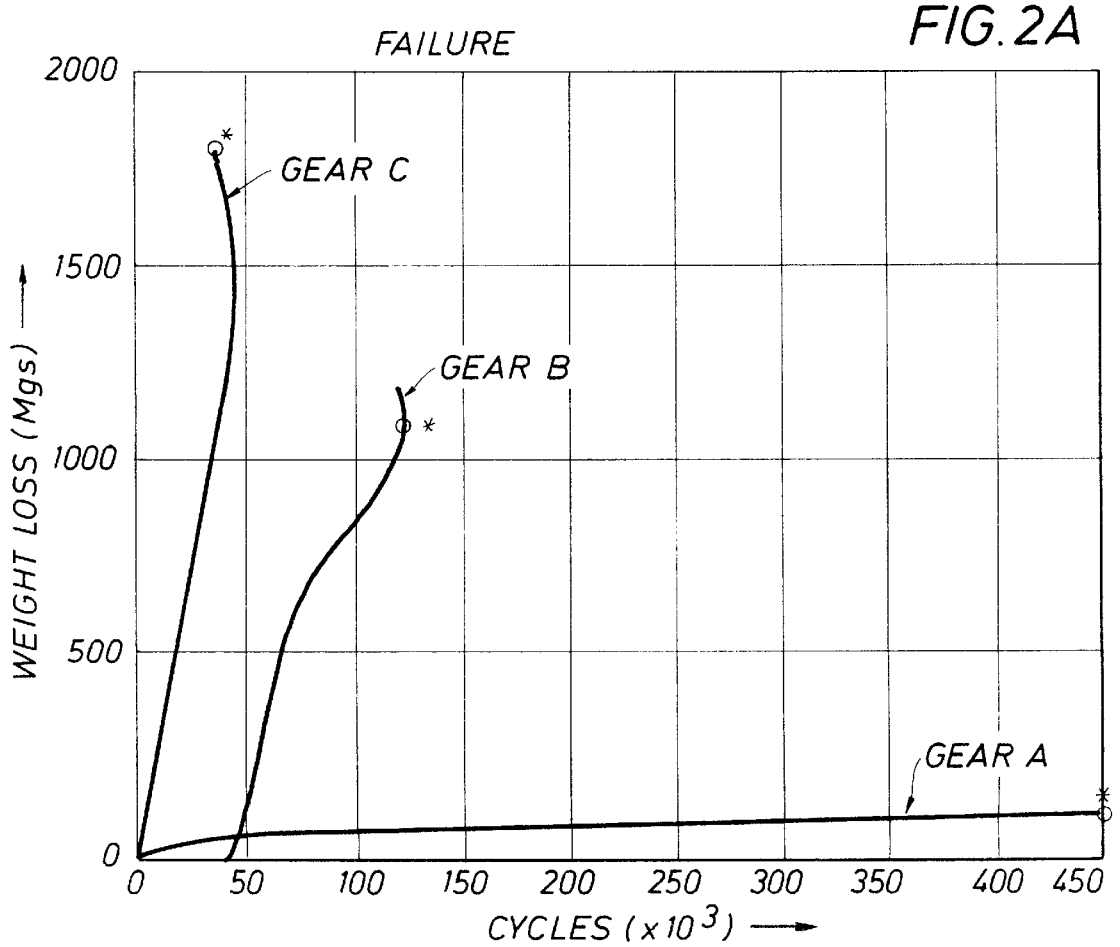
FIG. 2*a* shows the test run at torque of 4.3 N.m.
Figure 2B:
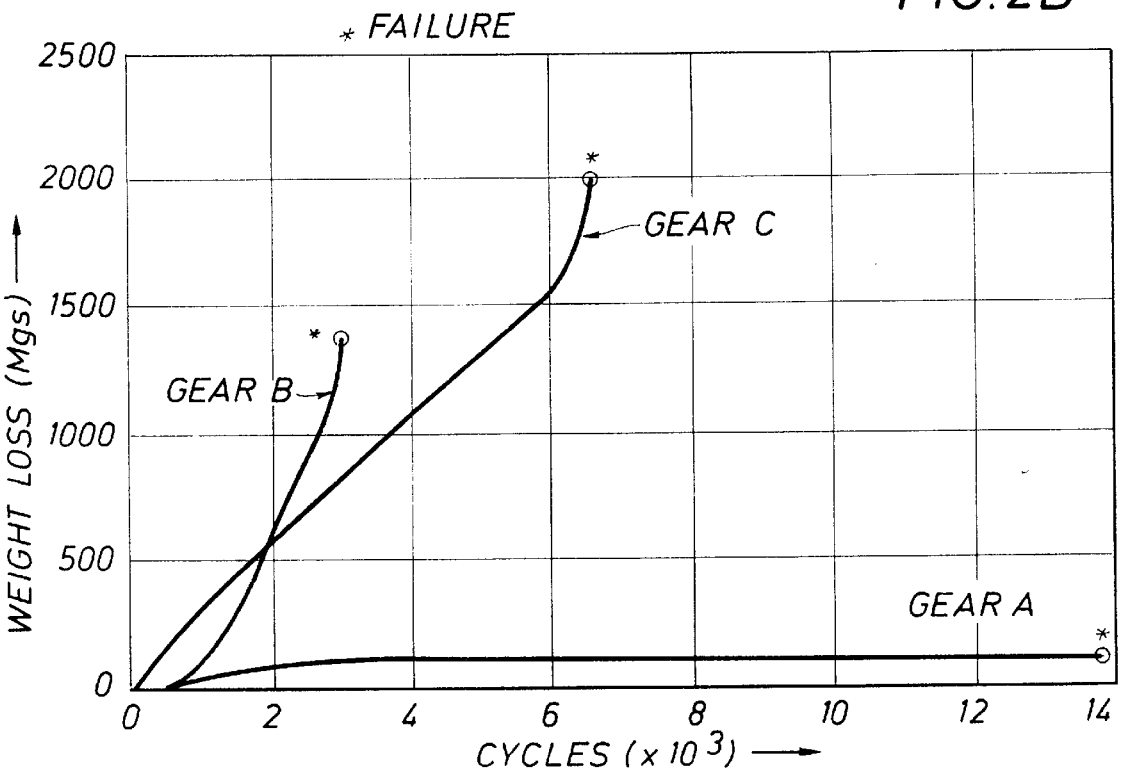
FIG. 2*b* shows the test run at torque of 11 N.m.

This example was conducted as set forth in Example 1 except that the four-square gear tester was periodically stopped so that gears could be disassembled and weighed. Material loss was taken as an indication of gear wear. Further, two different runs were conducted for each gear set: one run at a torque of 4.3 N.m (38 in-lbs) and the other at 11 N.m (95 in-lbs). Results of the 4.3 N.m example are shown in FIG. 2*a*. Results of the 11 N.m example are shown in FIG. 2*b*.

This example shows that polyketone gear systems exhibited a level of wear far lower than that found in commonly used polymeric gear systems. It was also observed that failure occurred in the case of polyketone gear systems as a result of mechanical fatigue while other polymeric gear systems failed because of wear/material loss. That is, non-polyketone gear systems failed because excessive tooth wear resulted in slippage and the inability to continue transmitting motion and power while the polyketone gear system transmitted motion and power up to the point of tooth breakage.

EXAMPLE 3

A noise isolation box was placed around the gears in the four-square tester used in each of the examples cited above. Two microphones were placed inside the box and were connected to "MODEL 2610" amplifiers commercially available from Bruel and Kjaer amplifiers and subsequently to a Nakamichi DMP 100 converter to convert analog signals to digital outputs. The outputs were then recorded on a Panasonic AG2400 VHS recorder. The recorded digital outputs were analyzed using a Bruel and Kjaer model 2032 FFT analyzer. Two separate analyses were conducted: 1) a narrow band analysis using a 16 Hz bandwidth in the frequency band of 0–1, 2800 Hz, and 2) an octave band analysis.

Figure 3:
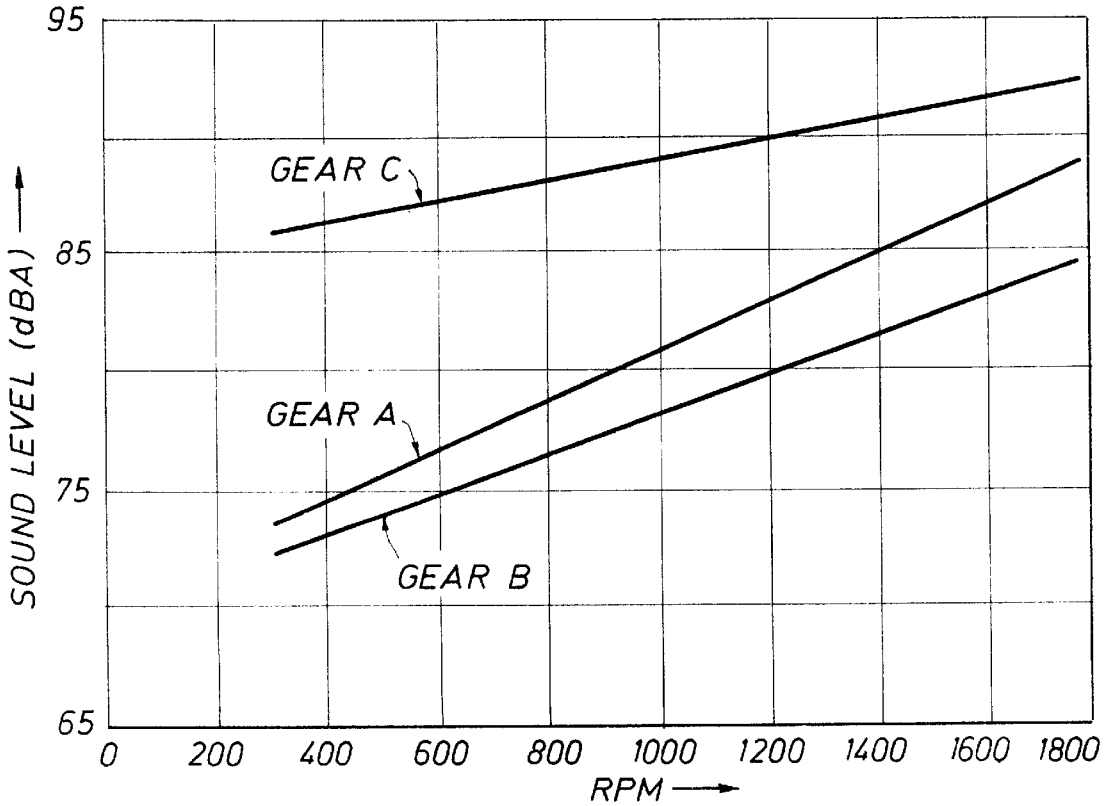
FIG. 3 shows the test run at torque 5.7 N.m.

When recordings were made without the actuation of the gears, it was found that any noise generated outside of the box with a frequency greater than about 175 Hz would not affect noise measurements inside the box. Gear fabrication was the same as that of Example 1. The results shown in FIG. 3 are from a run in which 5.7 N.m (50 in-lbs) of torque were applied.

EXAMPLE 4

A disk was machined from injection molded plaques of neat polyketone (Disk A) and acetal homopolymer (Disk B) sold under the tradename "DELRIN II 500" by E.I. du Pont de Nemours and Co. A stationary pin was machined from injection molded tensile specimens of the same materials. The disk and pin were then used in a standard pin-on-disk set-up using standard geometries. Surfaces in sliding contact were not altered from the as-injected molded state by the machining.

The as-machined geometry of the pin was a square block of dimensions 1 cm (0.394 inches) on each edge. The machined disk was rotated at a rate yielding an average surface velocity of 0.25 cm/s (49 ft/min) over the annulus resulting from the pin contacting the disk during the rotation. The pin was pressed against the disk with a force yielding a bearing pressure of $5\times10^6$ N/m$^2$ (725 lb/in$^2$). Table 1 shows the results obtained. The dynamic coefficient of friction (DCOF) and wear factors were determined with the wear factor being the average of both pin and disk.

The lower DCOF of the polyketone is indicative of higher lubricity. This, together with a wear factor two orders of magnitude lower than the acetal homopolymer shows that systems of polyketone means for transmitting motion and power in which sliding motion predominates are suitable while means made of other substances are not. Thus, such polyketone means include, for example, cams on plates, rotary bearings, and gear systems wherein power and motion is transmitted between non-parallel and non-intersecting shafts.

TABLE 1

| Polymer | Dynamic Coefficient of Friction | Wear Factor $\left(10^{-10}\frac{\text{in}^3\ \text{min}}{\text{lb-ft-hr}}\right)$ $2\times10^{-17}\frac{\text{m}^3}{\text{N}\cdot\text{m}}$ |
|---|---|---|
| Disc A | .3 | .21 |
| Disc B | .4 | 21 |

The wear factor is the volume of material worn off per unit of distance which the pin moved along the disc and per unity of force applied between pin and disc.

EXAMPLE 5

The polyacetal-H used in the experiment is Delrin II 500 (DELRIN is a trade mark) which is commercially available from Du Pont. The polyamide 6 is ORGAMIDE RMNCD (ORGAMIDE RMNCD is a trade mark) commercially available from Atochem.

The polyketone can be prepared as follows. A mechanically stirred autoclave with a capacity of 100 1 is charged with 45 kg of methanol and 3.5 kg of propene. After the contents of the autoclave is brought to 75 ° C., a 1:1 carbon monoxide/ethene mixture is blown in until a pressure of 45 bar is reached. Subsequently, a catalyst solution is introduced into the autoclave comprising 100 ml methanol, 100 ml toluene, 0.75 mmol palladium acetate, 15 mmol trifluoro acetic acid, and 0.90 mmol 1,3-bis[di(2-methoxyphenyl) phosphino]propane.

During polymerization, the pressure is kept at 45 bar by the introduction of a 1:1 carbon monoxide/ethene mixture. Polymerization is terminated after 47 hours by cooling the reaction mixture to room temperature and releasing the pressure. After the polymer suspension has been withdrawn through an opening in the bottom of the autoclave, the autoclave is flushed with 45 1 of methanol in order to remove polymer remaining behind. The methanol suspensions are combined and filtered. The terpolymer is washed with methanol and dried at 50° C. The yield is 5.2 kg of terpolymer with an LVN(60) of 1.88 dl/g, a bulk density of 290 kg/m$^3$ and a melting point of 228° C.

Pins and discs were formed and tested in a test set- up as described in ISO 7148 of a pin which was pressed onto a disk with a contact pressure of 5 MPa while the pin and disk moved with respect to each other at a speed of 0.25 m/s. In Tables 2 and 3 the wear has been given in $10^{-15}$ m$^3$/Nm.

TABLE 2

| disc | pin | wear factor of pin | wear factor of disc | total wear factor |
|---|---|---|---|---|
| polyacetal-H | polyketone | 0.2 | 0.1 | 0.3 |
| polyacetal-H | polyamide 6 | 0.5 | 3.8 | 4.3 |

TABLE 3

| disc | pin | wear factor of pin | wear factor of disc | total wear factor |
|---|---|---|---|---|
| polyketone | polyacetal-H | 2.9 | 2.8 | 5.7 |
| polyketone | polyamide 6 | 0.7 | 8.3 | 9.0 |

EXAMPLE 6

Pins and discs were tested in accordance with the procedure described in ISO 7148. Pins and discs were prepared from a polyketone prepared from carbon monoxide, ethene and a minor amount of propene; from polyamide 6,6 and from polyoxymethylene. The pins and discs were tested for 20 hours at a pressure of 2 MPa and at a velocity of 0.2 m/s. In Table 4 the total wear factor of pin and disc has been given in $10^{15}$ m$^3$/N.m.

TABLE 4

| | pin polyketone | pin polyamide 6.6 | pin: polyoxy-methylene |
|---|---|---|---|
| disc: polyketone | 13.4 | 13.6 | 11.7 |
| disc: polyamide 6.6 | 15.9 | 76.3 | 4.6 |
| disc: polyoxy-methylene | 0.82 | 1.66 | 513.7 |

I claim as my invention:

1. A tribological arrangement wherein at least two parts, a first part and a second part which are in contact at their surfaces, said first part consists essentially of an aliphatic polyketone while the second part consists essentially of a polymer which is not an aliphatic polyketone.

2. The arrangement of claim 1 wherein the polyketone is a linear alternating polymer which has been prepared from carbon monoxide and one or more olefinically unsaturated compounds.

3. The arrangement of claim 2 wherein the unsaturated compound is selected from the group consisting of ethene, propene, butene, and combinations thereof.

4. The arrangement of claim 1 wherein the polymer which is not an aliphatic polyketone is comprised of polyacetal.

5. The arrangement of claim 4 wherein the polyacetal is polyoxymethylene.

6. The arrangement of claim 1 further comprising an internal lubricant.

7. The arrangement of claim 2 further comprising an external lubricant.

8. The arrangement of claim 1 comprising a set of gears.

9. The arrangement of claim 1 comprising a bearing.

* * * * *